US010607480B2

(12) United States Patent
Israelsson (10) Patent No.: US 10,607,480 B2
(45) Date of Patent: Mar. 31, 2020

(54) METHOD FOR PERFORMING A REAL TIME ANALYSIS OF TRAFFIC LIGHT RELATED DATA

(71) Applicant: VOLVO CAR CORPORATION, Gothenburg (SE)

(72) Inventor: Erik Israelsson, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 282 days.

(21) Appl. No.: 15/635,572

(22) Filed: Jun. 28, 2017

(65) Prior Publication Data
US 2018/0012486 A1    Jan. 11, 2018

(51) Int. Cl.
| G08G 1/01 | (2006.01) |
| G08G 1/0967 | (2006.01) |
| G01C 21/32 | (2006.01) |
| G08G 1/017 | (2006.01) |

(Continued)

(52) U.S. Cl.
CPC .......... *G08G 1/0141* (2013.01); *G01C 21/32* (2013.01); *G08G 1/012* (2013.01); *G08G 1/0112* (2013.01); *G08G 1/0116* (2013.01); *G08G 1/0129* (2013.01); *G08G 1/0133* (2013.01); *G08G 1/096758* (2013.01); *G08G 1/096775* (2013.01);

(Continued)

(58) Field of Classification Search
CPC .. G08G 1/0141; G08G 1/0112; G08G 1/0116; G08G 1/012; G08G 1/0129; G08G 1/0133; G08G 1/096758; G08G 1/096775; G08G 1/017; G08G 1/095; G08G 1/096783; G08G 1/096791; G08G 1/0145; G08G 1/053; G08G 1/161; G08G 1/163; G08G 1/164; G01C 21/32; G01C 21/30; H04L 67/10; B60W 50/14
USPC ............................................. 701/117, 23, 45
See application file for complete search history.

(56) References Cited

U.S. PATENT DOCUMENTS

| 9,697,729 B2 * | 7/2017 | Vahidi .................. G08G 1/0141 |
| 9,963,106 B1 * | 5/2018 | Ricci .................... B60R 25/2018 |
| 10,115,305 B2 * | 10/2018 | Mortazavi ............... H04W 4/40 |

(Continued)

FOREIGN PATENT DOCUMENTS

| CN | 102779415 | 11/2012 |
| WO | 2009059766 | 5/2009 |

OTHER PUBLICATIONS

Extended European Search Report for European Application No. EP 16178243.8. Completed by the European Patent Office, dated Jan. 23, 2017, 7 Pages.

*Primary Examiner* — Richard A Goldman
(74) *Attorney, Agent, or Firm* — Brooks Kushman P.C.

(57) ABSTRACT

A method is described for performing a real time analysis of traffic flow control device related data using a plurality of vehicles connected in at least one vehicle cell network. The method compares position data from vehicles defining a traffic flow with received data for a traffic flow control device and geometry and topology data concerning a transport engineering construction related to the traffic flow control device to evaluate if a discrepancy can be detected between the geometry and topology data concerning the transport engineering construction and the traffic flow defined by the vehicles positions. The method may be used for updating and/or finding errors in the geometry and topology data concerning the transport engineering construction.

17 Claims, 3 Drawing Sheets

(51) Int. Cl.
G08G 1/095 (2006.01)
H04L 29/08 (2006.01)

(52) U.S. Cl.
CPC ............ G08G 1/017 (2013.01); G08G 1/095 (2013.01); H04L 67/10 (2013.01)

(56) References Cited

U.S. PATENT DOCUMENTS

| | | | |
|---|---|---|---|
| 10,126,135 B2* | 11/2018 | Mortazavi | G01C 21/3492 |
| 10,255,805 B1* | 4/2019 | Wolf | G08G 1/07 |
| 2006/0247852 A1* | 11/2006 | Kortge | G01C 21/3461 |
| | | | 701/533 |
| 2009/0138497 A1* | 5/2009 | Zavoli | G09B 29/106 |
| 2010/0063715 A1* | 3/2010 | Wynter | G08G 1/0104 |
| | | | 701/118 |
| 2011/0106368 A1* | 5/2011 | Miura | B60W 40/12 |
| | | | 701/31.4 |
| 2012/0136567 A1* | 5/2012 | Wang | G01C 21/3461 |
| | | | 701/414 |
| 2014/0266798 A1* | 9/2014 | Witte | G08G 1/096827 |
| | | | 340/907 |
| 2014/0277986 A1* | 9/2014 | Mahler | G06F 7/00 |
| | | | 701/93 |
| 2014/0358414 A1 | 12/2014 | Ibrahim et al. | |
| 2015/0197247 A1* | 7/2015 | Ichinokawa | B60W 30/143 |
| | | | 701/93 |
| 2016/0097849 A1* | 4/2016 | Nichols | G01S 13/91 |
| | | | 342/107 |
| 2016/0284215 A1* | 9/2016 | Ova | G08G 1/096716 |
| 2016/0330795 A1* | 11/2016 | Choi | H01L 21/8258 |
| 2017/0059335 A1* | 3/2017 | Levine | G06F 16/29 |
| 2017/0069208 A1* | 3/2017 | Nair | G01C 21/3415 |
| 2017/0084172 A1* | 3/2017 | Rolle | G08G 1/095 |
| 2017/0206783 A1* | 7/2017 | Miller | G08G 1/08 |
| 2018/0012486 A1* | 1/2018 | Israelsson | G08G 1/0112 |
| 2018/0018877 A1* | 1/2018 | Townsend | G08G 1/056 |
| 2018/0151064 A1* | 5/2018 | Xu | G08G 1/0125 |
| 2018/0203443 A1* | 7/2018 | Newman | G01C 21/3691 |
| 2019/0086219 A1* | 3/2019 | Hashisho | G01C 21/20 |
| 2019/0100200 A1* | 4/2019 | McNew | B60W 30/12 |
| 2019/0146500 A1* | 5/2019 | Yalla | G06K 9/00671 |
| | | | 701/25 |

* cited by examiner

METHOD FOR PERFORMING A REAL TIME ANALYSIS OF TRAFFIC LIGHT RELATED DATA

CROSS-REFERENCE TO RELATED APPLICATIONS

This application claims foreign priority benefits under 35 U.S.C. § 119(a)-(d) to European patent application number EP 16178243.8., filed Jul. 6, 2016, which is incorporated by reference in its entirety.

TECHNICAL FIELD

A method for performing a real time analysis of traffic light related data using vehicle data gathered by vehicle connected to a cell network to form a traffic flow. The real time data of the traffic flow can be compared with geometry and topology data for a specified section a transporting engineering construction such as a road intersection together with traffic light data.

BACKGROUND

Modern Traffic Light installations will include communication between the traffic light controllers and centralized back-end systems. Such connected traffic lights, also referred to as on-line traffic lights, will offer access to the present status of the traffic lights, i.e. the phases; red, yellow or green. On-line traffic lights also provide means to get access to the phase schedules, i.e. a scheme for the planned traffic light phase changes for a limited time window. Such traffic light data are often referred to as Signal Phase and Timing data or SPAT data. The SPAT data, once available in some back-end system, can be transmitted to vehicles to be used in in-vehicle applications, such as Time to Green countdown, GLOSA (Green Light Optimal Speed Advisory) to or Red Light Violation Warning. The SPAT data is however not sufficient but requires a complimentary information about the positions of the traffic light. More precisely, what road or lane traffic each traffic light is regulating. Such data are referred to as MAP data. In combination, the dynamic SPAT data and the more static MAP data will be sufficient data to enable connected traffic light functions.

The Chinese patent publication no CN102779415 (A) discloses a Method and device for real-time analysis of traffic signal phase. The traffic signal phase is analyzed using floating vehicle data such as the distances between stop points of the vehicles and traffic lights at the signal crossing intersection and/or the start and stop time of the vehicles.

However, there are problems associated with the use of this data for traffic light analysis applications.

SUMMARY

It has now been identified that while SPAT data is generally easily available from connected traffic light systems, the MAP data is very laboring and time consuming to retrieve. Further, even if the MAP data has been gathered, e.g. from drawings other technical documentation of the intersection design etc. there is a risk that the MAP data becomes incorrect as a result of reconstructions of intersections. Just as a matter of example, an existing lane may be converted to a lane reserved for public transportation. A road having one lane may suddenly be divided into two lanes and vice versa. The MAP data may easily be inaccurate, or incorrect, and thus pose a real threat to the driver if being connected with SPAT data to e.g. predict changes between red and green signals.

It is an object of the present disclosure to provide for a solution to at least solve some of the drawbacks associated with traffic light related data, or to reduce the drawbacks or at least to provide for a useful alternative to the solutions proposed in the prior art.

The objects are at least partly met by a method for performing a real time analysis of traffic flow control device related data using a plurality of connected vehicles in at least one vehicle cell network. The method comprises the steps of;

a) providing the status of a traffic flow control device, such as signal phase and timing data of the traffic flow control device. The traffic flow control device is positioned at a transportation engineering construction and;

b) providing geometry and topology data of at least a portion of the transportation engineering construction. The method further comprises the steps of providing real time data of a traffic flow passing the portion of the transportation engineering construction and, comparing the real time data of the traffic flow with data from at least step b), or from step a) and step b), to evaluate if a discrepancy can be detected.

The disclosure herein enables to use data from connected vehicles to automatically derive new MAP data, or to derive corrections to MAP data and/or to provide complementing data to MAP data. The solutions may remove tedious and labor intensive work to correctly maintain or update MAP data. It also provides means to detect and adjust MAP data to changes in the actual configuration of the transport engineering construction in question. It may further remove distractions and risks for a driver when being subjected to vehicle systems making wrong conclusions based on inaccurate MAP data.

Just as a matter of example, the real time data of the traffic flow may be derived from one or more of the following vehicle sensors or instruments; vehicle speed, vehicle identification, vehicle position data such as GPS position, enhanced GPS data, radio-frequency identification, vehicle-to-vehicle and vehicle-to-infrastructure communications, dead reckoning, LIDAR, radar, IR data, camera or other optical reading instruments, just to mention a few. When using a vehicle camera, the vehicle may identify the specific lane which the vehicle is driving in for example. This information may be compared with the status of the traffic flow control device relevant for that specific lane.

The transportation engineering construction is a road intersection, a bridge, a tunnel, a roundabout, a road turn, a road, or the like. It has been found that the method may be applied on substantially any transportation engineering construction although traffic lights at intersections, such as road intersections, are an implementation. It is a versatile method which enables real time update of the geometry and topology data that would otherwise the difficult to oversee. Just as matter of example, it is not unusual for a city to have multiple road construction and maintenance sites ongoing at the same time. It may be difficult to update all the related traffic lights. The method will free resources while at the same time provide vehicle drivers, and vehicle passengers, with updated and accurate information permitting better accuracy when using the vehicle systems.

A traffic flow control device may be one or more traffic lights, one or more gates, one or more road blocking devices, one or more garage doors or the like. The method can be implemented substantially on any infrastructure device which intended to control the flow of the traffic, and which can be manipulated to different states such as go, no-go or hold. The example given herein is mainly directed towards traffic lights but other traffic flow control devices are as mentioned possible.

If a discrepancy is detected, the discrepancy, or data relating to the discrepancy, may be sent to a traffic server and/or to at least some of the connected vehicles. By relaying, forwarding, or sending the detected discrepancy, the real time traffic data of the traffic flow may be used to complement, or replace at least portion of the MAP data. An updated view of the actual traffic that the specific traffic light governs is thus provided. As the discrepancy can be detected using a high number of vehicles or over a long period of time, the method provide accurate readings and data. Optionally or additionally, if a discrepancy is detected, the real time traffic data of said traffic flow may be used to create new, or complementing, geometry and topology data (MAP) of the transport engineering construction. The new, or complementing, geometry and topology data (MAP) of the transport engineering construction may be sent to a traffic server and/or to at least some of the connected vehicles.

If a discrepancy is detected, the real time data of the traffic flow of step c) may be registered, or used, as geometry and topology data, such as complementing, updated or new geometry and topology data. The registration may be performed locally in the vehicles or remotely in cloud-based administrated servers. This permits several users to make use of the detected errors in the MAP data.

The data in step a), step b) and step c) may be provided to the plurality of vehicles. The comparison may thus be performed locally in a vehicle. Optionally or additionally, the data in step a), step b) and step c) may be provided to a cloud-based administrated serve. The comparison may be performed by said cloud-based administrated server. The method is versatile in terms of that it may be performed locally in a vehicle and/or remotely in a cloud. The results may of course be compared for further improving the accuracy of the method.

The data of step a) may be registered as true. This step uses the signal phase and timing data of the traffic light as if they are fully accurate and correct. Hence, even though the signal phase and timing data of the traffic light is used, the control function is strictly directed towards the geometry and topology data of the specific transporting engineering construction in question.

If a discrepancy is detected, the signal phase and timing data of the traffic light of step a) and/or the geometry and topology data of step b) may be blocked from being forwarded to a number of vehicles, such as said vehicles of the cell network. The method may thus be manipulated so as to protect drivers and passengers from incorrect geometry and topology data by simply blocking such information from being forwarded to the vehicles of the cell network.

Optionally or additionally, if a discrepancy is detected, an alert may be sent to a first cloud-based administrated server, such as a traffic server, and/or to at least some of the vehicles. By issuing an alert as a response to a detected discrepancy, a driver or passenger, or maintenance worker, may be made aware of the anomaly, i.e. the mismatch, between the actual traffic flow at a traffic light and the data which is used to virtually describe that traffic light and the road segment it is relevant for. The alert may includes an identification of the specific transport engineering construction and/or the traffic light.

Identification data for the vehicles may be removed from the real time traffic data of the traffic flow. In order to protect the integrity of a vehicle owner, identification data for the vehicle can be removed from the data flows and simply discarded. The method does not need to establish the unique identity of a single vehicle, it is enough to use the fact that a number of vehicles travels along a route which deviates from the expected route provided by the SPAT data, or status data of the traffic flow control device, and the MAP data.

It is believed that the described method herein is advantageous with vehicles which are autonomous vehicles, self-driving vehicles or vehicles with auto-pilot function. Hence the vehicles may be autonomous vehicles, self-driving vehicles or vehicles with auto-pilot function. Vehicles which rely on autonomous driving functions and systems are dependent on updated and accurate data. The disclosed method may assist in providing such updated and accurate data.

It is within the boundaries of the present disclosure to further provide a computer program comprising program code for performing the method as disclosed herein when the program is run on a computer. A vehicle comprising the computer program is further disclosed herein, the vehicle may be an autonomous vehicle, a self-driving vehicle or a vehicle with an auto-pilot function.

Although only one traffic light is mentioned here, it should be noted that the method is applicable on one or more traffic lights, or at least two or more traffic lights, such as three or more, four or more, five or more.

In general terms; the present disclosure relates to a method for performing a real time analysis of traffic flow control device related data using a plurality of vehicles connected in at least one vehicle cell network. The method compares registered vehicle position data from a plurality of vehicles defining a traffic flow, with received signal phase and timing data for the relevant traffic flow control device and geometry and topology data concerning a transport engineering construction related to the traffic flow control device. The purpose is to evaluate if a discrepancy can be detected between the geometry and topology data concerning the transport engineering construction and the traffic flow defined by the vehicles positions, i.e. how the vehicles has driven. The method is useful for updating and/or finding errors in the geometry and topology data concerning the transport engineering construction. The traffic flow control device may be one or more traffic lights.

BRIEF DESCRIPTION OF THE DRAWINGS

Non-limiting embodiments of the present disclosure will be described with reference to the accompanying figures in which.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
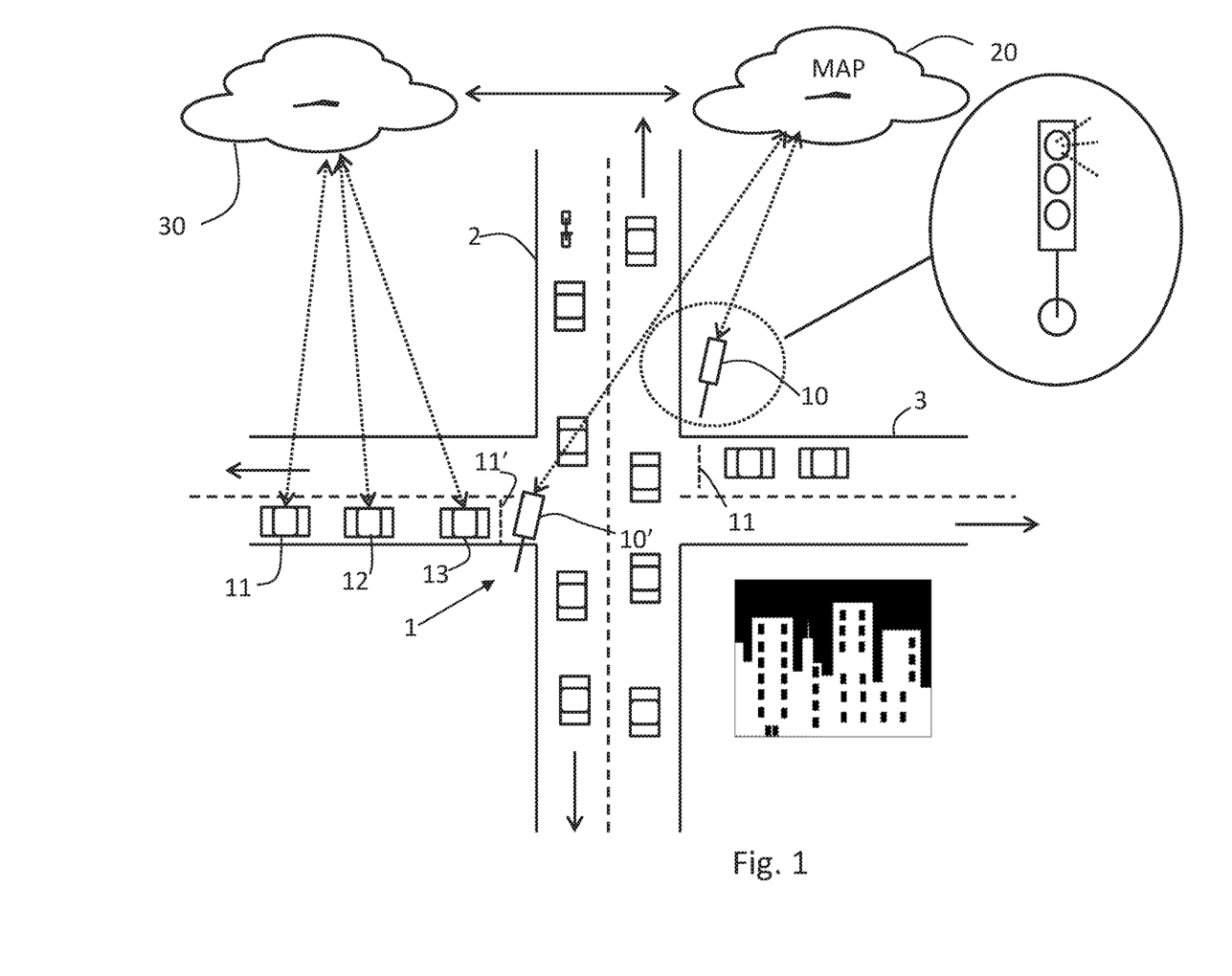
FIG. 1 shows a transporting engineering construction in the form of an intersection between two roads, and a plurality of vehicles connected to a cloud.

FIG. 1 shows an intersection 1 in a city formed by a first and a second road 2, 3. The travel directions of the roads 2, 3, are indicated by arrows. The intersection 1 is provided with a number of traffic lights 10, 10' by which traffic control is exercised. A number of vehicles 11, 12, 13 are travelling on the road. Although a higher number of vehicles such as automobiles, motorcycles, trucks and busses are travelling the roads 2, 3, only three vehicles 11, 12, 13 are used herein to illustrate non-limiting embodiments of the present disclosure. Likewise; the intersection 1 may be provided with a plurality of traffic lights but only two traffic lights 10, 10" are shown to illustrate non-limiting embodiments of the present disclosure. Stop marks 11, 11' are indicated at the traffic light 10, 10' at which the vehicles are intended to stop when the traffic lights 10, 10' are signaling the red light. The traffic lights 10, 10' in FIG. 1 are illustrated indicating the red light, the vehicles 11, 12, 13 has stopped by the stop mark 11', permitting the traffic on the first road 2 to cross the intersection 1 as shown by the illustrated vehicles in FIG. 1.

With reference to FIG. 1, a method for performing a real time analysis of traffic light related data will hereafter be described. The traffic lights 10, 10' are pending between phases of red, yellow and green lights following scheme data generally referred to as Signal Phase and Timing, SPAT. The traffic lights 10, 10' can be programmed using the SPAT data to switch between the different lights, i.e. red, yellow and green in this case, in order to govern the traffic which flow through the intersection 1. The traffic lights 10, 10' are further on-line, i.e. connected to a first cloud 20, also referred to as one or more remote or back-end servers. The "clouds" described herein are so called cloud-based administrative servers. As the traffic lights 10, 10' are connected to the first cloud 20, access is enabled to the schema data i.e. the SPAT data of the traffic lights 10, 10'. It should be noted that SPAT data for a specific traffic light may be stored or retrieved from other sources than the actual traffic light, but by retrieving the SPAT data from the actual traffic light, a more accurate real time analysis may be performed. It is believed that by retrieving the SPAT data directly from the traffic light concerned the SPAT data has a higher probability to be correct.

The communication between the clouds, vehicles and other nodes or operators described herein may be performed using one or more of the following: Vehicular ad hoc network VANET, intelligent vehicular ad hoc network InVANET, GSM, W-CDMA and/or WLAN such as Wi-Fi or the vehicle-specific IEEE 802.11p, Visible Light Communication (VLC), blue tooth, infrared, ZigBee, other cellular technologies like UMTS, LTE, or WiMAX IEEE 802.16, vehicle to vehicle V2V, vehicle to road access point V2R, Road Side Units (RSUs) and/or cellular networks for example.

Further available to the first cloud 20 is geometry and topology data, hereafter only referred to as MAP data, for the intersection 1. The geometry and topology data for the intersection 1 provides information about how the intersection 1 is configured and thus provide information about which part of the intersection the traffic lights 10, 10' are governing. The combined data provided by SPAT data and MAP data enables to match each individual traffic light status data to the corresponding road segment, in e.g. an intersection, to which the traffic light relevant. The SPAT and MAP message are standardized by SAE DSRC Technical Committee in the standard SAE J2735 (201603).

The vehicles 11, 12, 13 are connected to a second cloud 30 also referred to as one or more remote or back-end servers. The second cloud 30 is in this case administrated by the vehicle manufacturer. The second cloud 30 and the vehicles 11, 12, 13 are connected via at least one cell network. The vehicles 11, 12, 13 are constantly uploading vehicle data such as the vehicle position data to the second cloud 30 together with other vehicle data generated by the vehicle sensors for example. The vehicle data may be, but is not limited to; vehicle speed, vehicle identification, vehicle position data such as GPS position, enhanced GPS data, radio-frequency identification, vehicle-to-vehicle and vehicle-to-infrastructure communications, dead reckoning, LIDAR, radar, IR data, camera or other optical reading instruments, just to mention a few. The vehicle data may further include vehicle data relating to the status and performance of the vehicle itself such as engine status, oil levels, fuel levels, combustion data, tire data, suspension data and the like.

The vehicles 11, 12, 13 will continuously upload their position together with time data which will form real time traffic data relating to the intersection 1. Based on the vehicle data sent to the second cloud 30 by the vehicles 11, 12, 13 of the cell network, the traffic flow at the intersection may thus be mapped, or identified. It has been found that it may be advantageous to compare the real time traffic data derived from the vehicles in the cell network with geometry and topology data, i.e. MAP data, to find discrepancies. In fact, it has been found that the real time traffic data derived from the vehicles in the cell network can be compared with substantially any geometry and topology data for transportation engineering constructions to find discrepancies. Transportation engineering constructions can be tunnels, bridges, roads or road segments, turns, intersections and the like. Just as a matter of example, transportation engineering construction data relating to a tunnel may be data about how the tunnel extends, how long the tunnel is, how many lanes the tunnel has.

Generally MAP data may include; message management data such as message count, message ID; map meta data such as road topology type e.g. curve, intersection, parking area etc.; data source such as data provision supplier or agency, version date etc., restriction information; intersection geometry of one or more intersections such as description of each lane via attributes, lane ID, lane type, lane width, lane length, lane geographic description e.g. node coordinates, allowed traffic, allowed maneuvers, lane travel direction, applied speed limit, how lanes cross over with each other and so forth. Just as a matter of example, a lane may be assigned to a group of lanes which are provided with a group ID. The group ID can thereafter be used with the SPAT data to match the SPAT data and the intersection topology.

By comparing the provided real time data of the traffic flow passing the relevant part of the intersection 1 with SPAT data and MAP data and evaluate if a discrepancy can be detected, possible errors in the MAP data can be detected.

Just as a matter of example and with reference to FIG. 1, the traffic lights 10, 10' are indicating a red light. The traffic lights 10, 10' being on-line, transmit the SPAT data to the first cloud 20, that at a specific time number, they are indicating a red light. The SPAT data and the MAP data is forwarded, or retrieved by the second cloud 30. Using a comparative algorithm, the SPAT data and the MAP data can be compared with the real time data of the traffic flow provided from the vehicles 11, 12, 13, or in other words by vehicle position data which defines a traffic flow. In this case, it can be established that the traffic flow at the intersection 1, and the vehicles travelling on the second road 3 are indeed stopping at the intersection 1 in accordance with the SPAT data of the traffic lights 10, 10' and the MAP data of associated with the specific traffic lights 10, 10'. Hence its can be established that the MAP data of the intersection 1 is accurate. Likewise, although not illustrated with reference numerals; the traffic lights (not shown) associated with the first road 2 would indicate a green light; the real time traffic flow derived from the vehicles traveling on that road would confirm the accuracy of the green light and the MAP data correlated with those traffic lights. The vehicles 11, 12, 13 which may be provided with systems such as Time To Green countdown, GLOSA (Green Light Optimal Speed Advisory) to or Red Light Violation Warning, will thus see that their systems are fully operational and functioning as expected. When systems are operational and functioning as intended, they generally do not distract the driver. In the this case the comparison did not find a discrepancy, hence no specific action was taken as a consequence.

A comparison can thus be used to create or confirm a hypothesis for which road is controlled by what traffic light. If vehicle data shows that traffic flows through an intersection at the same time as one or more traffic lights are green, and/or if the traffic flow stops at the same time the one or more traffic lights are red, there is a correlation between SPAT data, the MAP data and the traffic flow as measured via the vehicle data.

Figure 2:
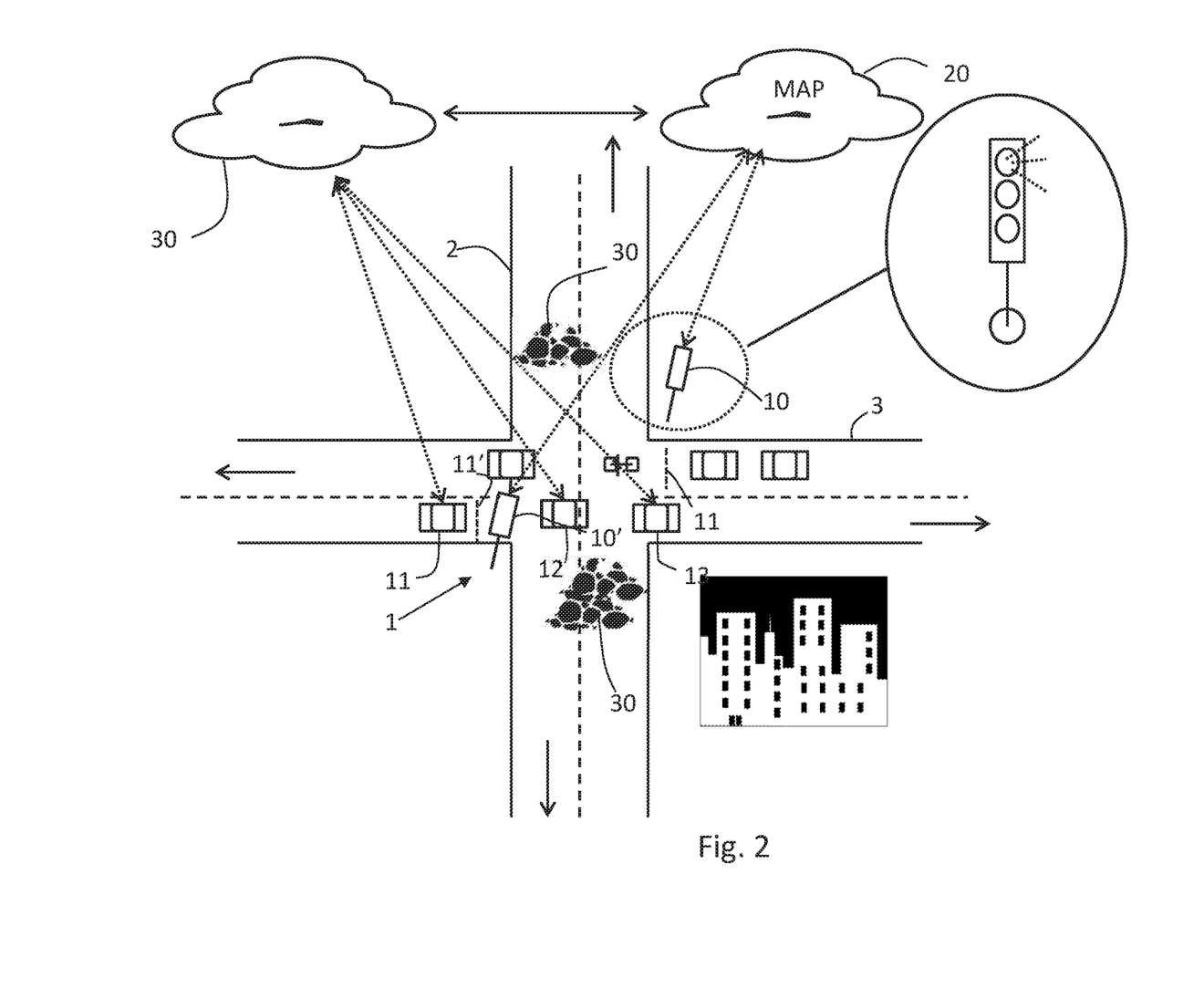
FIG. 2 shows the intersection of FIG. 1 but with road work, thus rendering the geometry and topology data for the specific section of the intersection which is governed by the traffic lights outdated and incorrect.

FIG. 2 shows the same intersection 1 and similar vehicles connected to at least one cell network. The same features are identified with the same references. FIG. 2 illustrates a scenario in which the first road 2 is closed due to road work as indicated by rubble 30 on the first road 2. The traffic lights 10, 10' are however transmitting their SPAT data in the same manner as earlier.

In this case, provided that the SPAT data is correct, the data comparison at the second cloud 30 will reveal that there is a discrepancy between the MAP data and the real time data of the traffic flow. It will reveal that although the first and the second traffic lights 10, 10' are indicating a red light, the real time data of the traffic flow shows that no vehicles are stopping at the first and the second traffic lights 10, 10'. If the vehicles 11, 12, 13, systematically run a red light in the intersection 1, as defined in the SPAT and MAP data, it can be assumed that the MAP data is false, i.e. inaccurate. The reasoning is that it is extremely unlikely that multiple vehicles run a red light. The detected abnormality, is much more likely to stem from "false" MAP data, than from actual red light violations. The traffic when measured over a plurality of vehicles generally correctly follows the real traffic lights but since the MAP data is false, there is a mix up of the locations of traffic light relative to the road network that present itself in the second cloud 30 as a difference between real time data of the traffic flow and the SPAT data and the MAP data. It will be detected that the vehicles 11, 12, 13 are systematically running red lights when crossing the intersection 1 at the first and the second traffic lights 10, 10'. A logic, or algorithm, in the second cloud 30 can detect such anomalies where the MAP data and SPAT data is not in agreement with the actual traffic flow, as derived from e.g. the position data of the connected vehicles 11, 12, 13. Again it should be noted that the vehicles 11, 12, 13 are illustrated as three vehicles only for the sake of clarity, but in practice a higher number of vehicles will be used to provide accurate data representing a traffic flow.

Hence systematic errors in the MAP data can thus be detected and in some way corrected. If the MAP data is not corrected, vehicles having systems which rely only on the MAP data may have the systems indicating a red light when in practice it is green, or worse a green light, when in practice it is red. It is easy to see that a mismatch between the real status of the traffic lights and at the intersection 1, or any transportation engineering construction, and the MAP data, can cause distractions for a driver and thus compromise the safety of the passengers in the vehicles. It may further cause navigation errors, or at least increase the risk for navigation errors for autonomous vehicles, or vehicles having self-driving capabilities.

It may thus be advantageous that if one or more discrepancies are detected, the cloud connected to the vehicles of the cell network, may be prompted to stop using the MAP data and even possibly the SPAT data from the concerned traffic lights, or optionally from the traffic light system governing the concerned traffic lights. In other words it may stop distributing the incorrect information, i.e. the incorrect MAP data, to the connected vehicles. This will quickly prevent distribution of incorrect data to the connected vehicles and minimize nuance to drivers. In a similar manner, if the MAP data which earlier has been identified as incorrect is identified as correct, such information should be distributed as soon as possible. In this manner, the method permits continuous input and output of updates in the form of corrected data, complementing data and so forth.

As an option, if it is assumed that the SPAT is correct, the vehicle position data from the connected vehicles can be used to infer correct MAP data, or at least improved MAP data, for traffic lights that are continuously publishing their SPAT data. A logic, or algorithm, in the cloud can detect correlations between the real time data of the traffic flow derived from the connected vehicles and the SPAT data from the traffic lights. If the correlation is observed over a predetermined period of time, or after a predetermined number of vehicles, it may be concluded by the cloud logic that the traffic light is to be found at that specific location, i.e. the MAP data of the traffic light. The task can be limited to smaller geographical locations for example. Even if it is unknown what exact position a traffic light has within an intersection, it is likely that it is known in which intersection the traffic light is located. The task is reduced to correlate the SPAT of the different traffic lights in a specific intersection to the various traffic flows on the roads and lanes in the intersection. Just as a matter of example, it can be detected if a traffic flow stops in a synchronous manner with the red light of a traffic light. If that is the case, it can be assumed that the forward end of that traffic flow, i.e. of a number of vehicles, is in a near proximity to the position of the traffic light operating synchronously with the traffic flow.

In order to remove or reduce the chance for wrong readings, e.g. caused by stray vehicles accidentally running a red light, the method described herein will operate on data provided by; a plurality of vehicles, and/or over a predetermined period of time. This will prevent stray vehicles from being identified as a discrepancy. The plurality of vehicles may be at least 10 vehicles or more within one hour for example. Just as a matter of example, the plurality of vehicles may be 10 or more, 50 or more, 100 or more. The predetermined period of time may be 1 hour, 5 hours, 12 hours, or 24 hours or more. Additional examples; the plurality of vehicles may be at least 100 vehicles counted within 48 hours. The number of vehicles may be decided simply by counting the number of vehicles passing a reference point, e.g. the traffic light in question.

As described above, a first and a second cloud 20, 30 are used to illustrate non-limiting embodiments of the disclosure. The MAP data and the SPAT data may be governed by a state function such as by a municipality operated company related to control and maintenance of traffic signal systems for example. The vehicle data, including real time data of the traffic flows, and the vehicle position data, is available in the second cloud 30, e.g. governed by a vehicle manufacturer. As vehicle data may be related to individual integrity of the drivers or passengers, it may be desirable not to distribute such data to external parties. Hence according to an embodiment, the First and the second clouds 20, 30 are connected so that SPAT data and MAP data are communicated between the first and the second cloud 20, 30. The logic used herein may thus be allocated in the second cloud 30, i.e. the cloud forming a part of the vehicle cell network. Any discrepancies, e.g. false MAP data may be reported back to the first cloud 20, e.g. a traffic light cloud or an intelligent traffic system. Similarly, correct MAP data, derived from the correlation between traffic flows and SPAT, or from the discrepancy between the MAP data from the first cloud 20 and the real time data of the traffic flow, can be calculated in the second cloud, e.g. a vehicle manufacturer cloud, and sent from the second could 30 to the first cloud 20. This way, the proposed solution is realized without any disclosure of e.g. vehicle positions to external parties. It should further be noticed that the method may be performed by individual vehicles either as complementing to a cloud operated method or instead of a cloud operated method.

Figure 3:
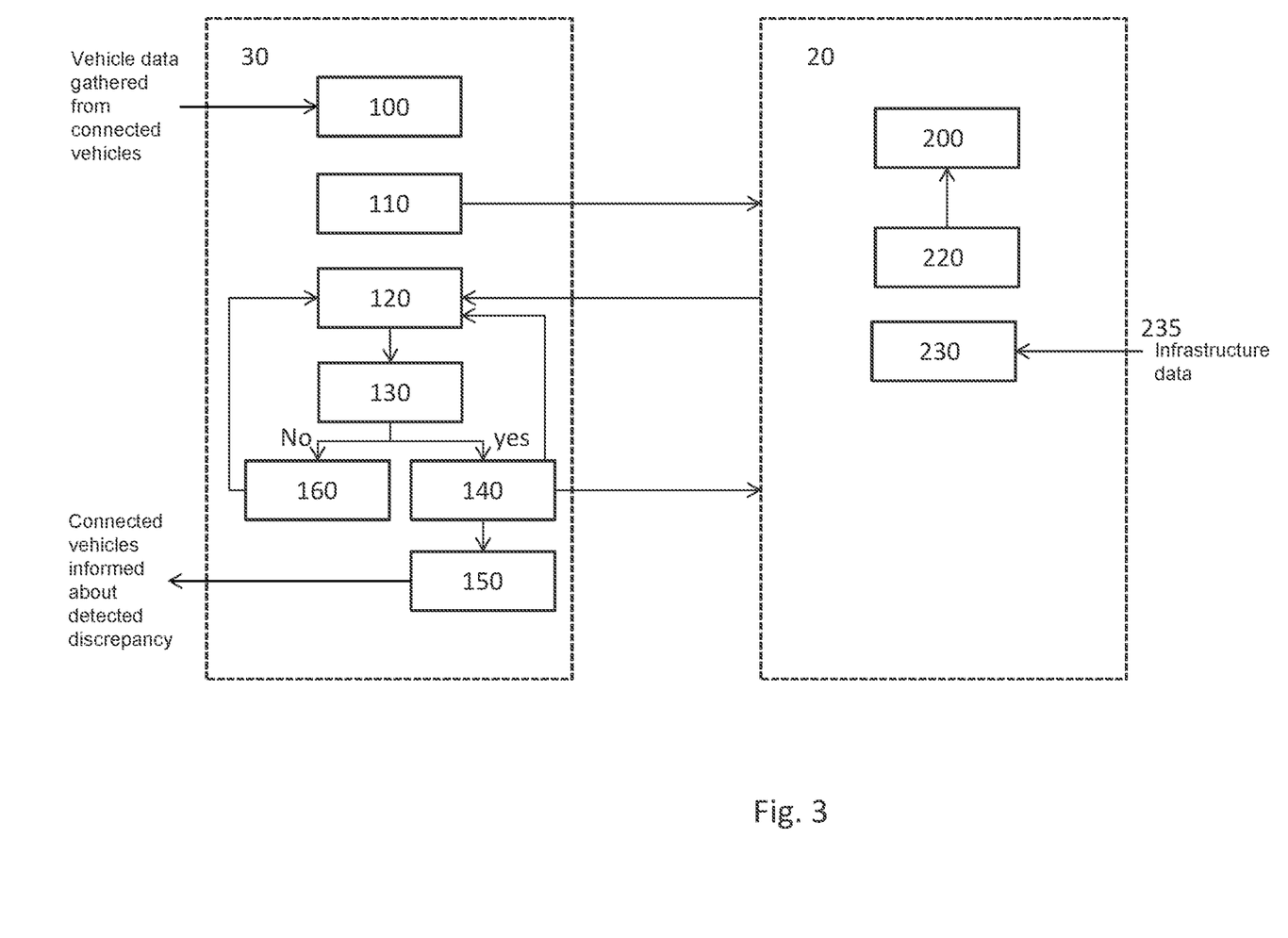
FIG. 3 is a schematic block diagram illustrating the method.

FIG. 3 shows a schematic block diagram to illustrate the method for performing a real time analysis of traffic light related data as disclosed herein.

100; vehicle data is gathered from a plurality of vehicles connected to a cloud-based administrated server 30 via at least one cell network. The vehicle data 100 includes vehicle position data such as GPS data, enhanced GPS data. The vehicles may communicate over GSM, W-CDMA and/or Wi-Fi networks for example, or using other communication networks as disclosed herein. Time and additional data may further be gathered. The vehicle position data and the time for each position, forms real time data of a traffic flow in which the connected vehicles, i.e. the reporting vehicles, forms the base of that traffic flow.

110; a request for SPAT data and MAP data is sent to an intelligent traffic system 200 governed by a municipality and which in the shown embodiment is formed by a cloud-based administrated traffic server 20, hereafter referred to the first cloud 20. The request may be sent intermittently or it may be a continuous request, i.e. a continuous information flow without having plurality of requests being issued.

120; SPAT data and MAP data is received from the intelligent traffic system 200 and is stored; temporarily or for a longer period of time in a storage module, or in the cloud 30.

130; the SPAT data and the MAP data are compared via a comparative algorithm with the data gathered in step 100 in order to find discrepancies there between. The analysis is performed in order to find contradictions between e.g. MAP data indicating how a road, tunnel or e.g. a bridge should theoretically be used, and the actual real time traffic flow at the traffic light in question. If a discrepancy is identified, such as if vehicles are detected to run a red light at a specific intersection repeatedly and in great numbers, it may be deducted that the MAP data is inaccurate in terms of that the traffic light is no longer governing the intersection for some reason, i.e. it is not correlating with the MAP data. A reason may due to road work, construction work, re-routings, or other transporting engineering operation being performed in the proximity of the specific traffic light in question. Hence a YES state has been identified, i.e. a discrepancy has been detected.

140; when a discrepancy has been detected, the discrepancy may be forwarded to the cloud-based administrated traffic server 20, i.e. the first cloud 30 and the intelligent traffic system 200. The intelligent traffic system 200 may issue a temporary correction if desirable which could be retrieved by the cloud 30. However, it may be advantageous if the cloud 30 directly informs, or relays the information to the connected vehicles.

150; the connected vehicles are informed about the detected discrepancy and that the real time data of the traffic flow is to form the base for the MAP data, or be used as complementing data. The substitution, or correction, of the MAP data, can be temporarily or permanently until a new discrepancy is detected which correlates to the specific traffic light and/or MAP data, i.e. to the earlier discrepancy detected. The connected vehicles may now rely on their traffic safety systems and that the MAP data of the specific route, or road, at which they travel has been updated with real time data of how the actual transportation engineering construction is related to the traffic light.

160; If no discrepancy is detected, the cloud 30 may issue an OK, a restoration command, or simply stop the logic at that point. The OK, i.e. a confirmation that no discrepancy has been detected, may be returned for storing 120 in the storage module or in the cloud 30.

200; the intelligent transport system (ITS) may be connected to a plurality of traffic lights 220 which continuously provide the ITS with SPAT data. Further connected are a MAP data provider 230. The MAP data provider 230 may be external to the ITS or be a part of the ITS. The MAP data may be combined with other infrastructure data 235. It should be noted that the SPAT data and the MAP data can be sent to the second cloud 30 as one message SPAT/MAP message. Generally the MAP data includes data from road segment, regional map data and the geometry, e.g. intersection geometry if the transporting engineering construction is an intersection.

It should be noted that cloud 20, cloud 30, traffic flow control devices 10, 10', 220, the plurality of vehicles 11, 11', 12, 12', 13, 13', as well as any server, logic, algorithm, system, device, unit, provider, data, module, node or the like described herein may comprise and/or be implemented in or by one or more appropriately programmed processors (e.g., one or more microprocessors including central processing units (CPU)) and associated memory and/or storage, which may include operating system software, application software and/or any other suitable program, code or instructions executable by the processor(s) for controlling operation thereof, for providing and/or controlling interaction and/or cooperation between the various features and/or components described herein, and/or for performing the particular algorithms represented by the various functions and/or operations described herein. The cloud 20, cloud 30, server(s), logic, algorithm(s), programs, code, instructions, memory and/or storage may be provided at a central location or at multiple different locations. The method and systems described herein may provide for distributed computing involving the various features and/or components describe herein over one or more networks as also described. In that regard, it should also be noted that cloud 20, cloud 30, traffic flow control device 10, 10', 220, the plurality of vehicles 11, 11', 12, 12', 13, 13', as well as any server, logic, algorithm, system, device, unit, provider, data, module, node or the like described herein may comprise any computer hardware and/or software and/or electrical hardware known in the art configured or provided to enable communication between such features and/or components, such as one or more transceivers, including communication over one or more networks which may include cellular and/or other wireless networks.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for performing a real-time analysis of traffic flow control device related data using a plurality of vehicles connected in at least one vehicle cell network, the method comprising:
   a) providing status data of a traffic flow control device to a cloud-based administrated server, the status data of the traffic flow control device comprising signal phase and timing (SPAT) data, the traffic flow control device being positioned at a transportation engineering construction;
   b) providing geometry and topology data of at least a portion of the transportation engineering construction to the cloud-based administrated server;
   c) providing real time data of a traffic flow passing the at least a portion of the transportation engineering construction via the plurality of vehicles to the cloud-based administrated server; and
   d) comparing, by the cloud-based administrated server, the real-time data of the traffic flow with data from step (a) and step (b) to detect a discrepancy.

2. The method according to claim 1, wherein the transportation engineering construction comprises a road intersection, a bridge, a tunnel, a roundabout, a road turn, or a road.

3. The method according to claim 1, wherein the traffic flow control device comprises one or more traffic lights, one or more gates, one or more road blocking devices, or one or more garage doors.

4. The method according to claim 1, wherein the data in steps (a), (b) and (c) is provided to the plurality of vehicles and the comparison is optionally performed locally in a vehicle.

5. The method according to claim 1, wherein the data of step (a) is registered as true.

6. The method according to claim 1, wherein, in response to a discrepancy being detected, the signal phase and timing status data of the traffic flow control device of step (a) and/or the geometry and topology data of step (b) is blocked from being forwarded to at least some of the vehicles.

7. The method according to claim 1, wherein the data from step (a) and (b) is received from another cloud-based administrated server, such as a traffic server.

8. The method according to claim 1, wherein, in response to a discrepancy being detected, the discrepancy or data relating to the discrepancy is sent to another cloud-based administrated server, such as a traffic server, and/or to at least some of the vehicles.

9. The method according to claim 1, wherein, in response to a discrepancy being detected, real time data of the traffic flow is used to create new or complementing geometry and topology data of the transport engineering construction.

10. The method according to claim 1, wherein, in response to a discrepancy being detected, the real time data of the traffic flow of step (c) is registered or used as geometry and topology data, such as complementing, updated or new geometry and topology data.

11. The method according to claim 1, wherein, in response to a discrepancy being detected, an alert is sent to another cloud-based administrated server, such as a traffic server, and/or to at least some of the vehicles.

12. The method according to claim 11, wherein the alert includes an identification of the transport engineering construction and/or the traffic light.

13. The method according to claim 1, wherein identification data for the vehicles is removed from the real time data of the traffic flow.

14. The method according to claim 1, wherein the vehicles are autonomous vehicles, self-driving vehicles or vehicles with an auto-pilot function.

15. A non-transitory computer readable medium having stored computer executable instructions which, when executed in a system comprising a traffic flow control device, a plurality of vehicles connected in a vehicle cell network, and at least one cloud-based administered server, cause the system to:
   a) provide status data of a traffic flow control device to the cloud-based administrated server, the status data of the traffic flow control device comprising signal phase and timing (SPAT) data, the traffic flow control device being positioned at a transportation engineering construction;
   b) provide geometry and topology data of a portion of the transportation engineering construction to the cloud-based administrated server;
   c) provide real time data of a traffic flow passing the portion of the transportation engineering construction via the plurality of vehicles to the cloud-based administrated server; and
   d) compare, at the cloud-based administrated server, the real-time data of the traffic flow with the status data of the traffic flow control device and the geometry and topology data of the portion of the transportation engineering construction to detect a discrepancy.

16. A method for performing a real-time analysis of traffic related data using a plurality of vehicles connected in a vehicle cell network, the method comprising:
   a) receiving status data of a traffic flow control device at a cloud-based administrated server, the status data of the traffic flow control device comprising signal phase and timing (SPAT) data, the traffic flow control device being positioned at a transportation engineering construction and the server being positioned at a location remote from the traffic flow control device;
   b) receiving at the cloud-based administrated server geometry and topology data of a portion of the transportation engineering construction;
   c) receiving at the cloud-based administrated server real time data of a traffic flow passing the portion of the transportation engineering construction from the plurality of vehicles; and
   d) comparing at the cloud-based administrated server the real-time data of the traffic flow with the status data of the traffic flow control device and the geometry and topology data of the portion of the transportation engineering construction to detect a discrepancy.

17. The method of claim 16, further comprising, in response to a discrepancy being detected, updating the geometry and topology data of the portion of the transportation engineering construction based on the received real time data of the traffic flow.

\* \* \* \* \*

UNITED STATES PATENT AND TRADEMARK OFFICE
CERTIFICATE OF CORRECTION

PATENT NO. : 10,607,480 B2
APPLICATION NO. : 15/635572
DATED : March 31, 2020
INVENTOR(S) : Erik Israelsson et al.

It is certified that error appears in the above-identified patent and that said Letters Patent is hereby corrected as shown below:

On the Title Page

Item [30], Insert:
-- Jul. 7, 2016 (EP) 16178243.8 --.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*